(12) United States Patent
Kitzmiller et al.

(10) Patent No.: US 6,176,529 B1
(45) Date of Patent: Jan. 23, 2001

(54) TORSIONAL UNDER-RIDE GUARD

(75) Inventors: James A. Kitzmiller, New Bremen; Terry D. Campbell, Quincy, both of OH (US)

(73) Assignee: Henschen div. of QDS Components, Jackson Center, OH (US)

(*) Notice: Under 35 U.S.C. 154(b), the term of this patent shall be extended for 0 days.

(21) Appl. No.: 09/233,588

(22) Filed: Jan. 19, 1999

(51) Int. Cl.$^7$ ................................................ B60R 19/02
(52) U.S. Cl. ........................ 293/102; 293/134; 293/136; 293/146
(58) Field of Search ................................. 293/102, 103, 293/132, 135, 136, 137, 143, 144, 145, 146, 118, 120, 121

(56) References Cited

U.S. PATENT DOCUMENTS

| | | | | |
|---|---|---|---|---|
| 2,188,142 | * | 1/1940 | Blair | 293/55 |
| 2,639,933 | * | 5/1953 | Meyer et al. | 293/146 |
| 2,712,742 | * | 7/1955 | Neidhart | 64/14 |
| 2,729,442 | * | 1/1956 | Neidhart | 267/21 |
| 2,789,854 | * | 4/1957 | Hope | 293/145 |
| 3,005,657 | * | 10/1961 | Walker | 296/37.2 |
| 3,771,824 | * | 11/1973 | Applegate | 293/136 |
| 3,795,392 | * | 3/1974 | Nemec | 293/136 |
| 3,913,963 | * | 10/1975 | Persicke | 293/134 |
| 3,923,330 | * | 12/1975 | Viall, Sr. et al. | 293/146 |
| 3,992,047 | * | 11/1976 | Barenyi et al. | 293/135 |
| 4,105,237 | * | 8/1978 | Viall, Sr. et al. | 293/102 |
| 4,358,239 | * | 11/1982 | Eggert | 293/132 |
| 4,410,207 | * | 10/1983 | Scharf | 293/118 |
| 4,541,661 | * | 9/1985 | Hawk | 293/134 |
| 4,582,351 | * | 4/1986 | Edwards | 293/102 |
| 5,507,546 | * | 4/1996 | Holley | 293/102 |
| 5,520,428 | * | 5/1996 | Bell | 293/102 |

\* cited by examiner

*Primary Examiner*—Joseph D. Pape
*Assistant Examiner*—Kiran Patel
(74) *Attorney, Agent, or Firm*—Dechert (57) ABSTRACT

An energy absorption device designed to be mounted on the rear of a high elevation vehicle (e.g. a truck, cargo carrier, trailer or semi-trailer). More particularly, a torsional under-ride guard for use with a high elevation vehicle, which torsional under-ride guard reduces the likelihood that another vehicle will under-ride the high elevation vehicle and absorbs some of the impact energy created when another vehicle collides with the torsional under-ride guard.

23 Claims, 4 Drawing Sheets

TORSIONAL UNDER-RIDE GUARD

This invention relates to an energy absorption device mounted on the rear of a high elevation vehicle (e.g. a truck, cargo carrier, trailer or semi-trailer). More particularly, the invention relates to a torsional under-ride guard designed for use on a high elevation vehicle, which reduces the likelihood that another vehicle will under-ride the high elevation vehicle and provides means for absorbing some of the impact energy created when another vehicle collides with the torsional under-ride guard.

Trucks and cargo carriers (e.g., trailers and semi-trailers, etc.) frequently have an elevated floor (hereinafter, trucks and cargo carriers and other vehicles having an elevated floor will be referred to collectively as "high elevation vehicles"). That is, the lowest portion of these high elevation vehicles is frequently relatively high compared with the front ends of passenger cars and other low elevation vehicles such as pick-up trucks. As a result, when a passenger car or other low elevation vehicle impacts the rear of a high elevation vehicle, the front end may travel under the floor of the high elevation vehicle, and the passenger compartment may slam into the rear of the high elevation vehicle body severely or fatally injuring those in the passenger compartment of the vehicle which is under-riding the high elevation vehicle.

To minimize under-ride collisions, high elevation vehicles have used various bumper designs. One such bumper design comprises a kind of step bumper consisting of a cross bar extending between two vertical posts, one mounted on each side of the rear of the high elevation vehicle. The step bumper extends from side to side at the lower end of the vertical posts. A brace on each side extends up from the bottom of the vertical post forward and inclined at an angle towards the trailer. These inclined braces or side members on each side collapse if the impinging vehicle hits the bumper with too much speed.

One problem with this previously known bumper design is that the bumper and step portion is subject to damage when the high elevation vehicle is backed into a loading dock. That is, due to poor visibility in the docking area or lack of attention on the part of the driver during the docking procedure, the vehicle may impact the loading dock with sufficient force to damage the bumper.

Another design uses vertical posts mounted at each side of the rear of the vehicle, which vertical posts are hinged at the upper end to the top of the high elevation vehicle. The bumper extends between the two vertical posts at the bottom of the vertical post. A crash shock absorber is mounted at each side of the bumper to absorb shock as the bumper is pushed towards the front of the high elevation vehicle by an impinging vehicle. The impinging vehicle collapses the shock absorbers as the vertical posts pivot about the upper hinges or pivot points.

One problem associated with this bumper design is that the bumper system exerts a separation force subsequent to an impact between the high elevation vehicle and an impinging vehicle. That is, the bumper may cause the high elevation vehicle and impinging vehicle to separate subsequent to an impact. Such separation or relative movement of the vehicles post-collision can present a danger to the occupants of the vehicles, bystanders and rescue personnel.

The torsional under-ride guard of the present invention overcomes the above-identified shortcomings of the prior high-elevation vehicle bumper systems. Upon high impact collision, such as with an impinging vehicle, the torsional under-ride guard of the present invention remains locked in its retracted position, eliminating the dangers associated with having the device snap back to its original position upon separation of the impinging vehicles. Upon a low impact collision, such as that encountered when a high elevation vehicle backs into a loading dock or other property, the torsional under-ride guard of the present invention retracts so as to prevent damage to the property contacting the rear of the vehicle and/or to the bumper system. Upon separation of the vehicle from the property, the torsional under-ride guard of the present invention returns to its original position, ready for deployment without the need for repair or resetting.

SUMMARY OF THE INVENTION

The present invention provides a torsional under-ride guard adapted to be mounted to a high elevation vehicle. Specifically, the present invention provides torsional under-ride guards for use on high elevation vehicles, which guards are designed to prevent a low-elevation vehicle, upon colliding with the rear end of a high elevation vehicle, from under-riding the high elevation vehicle. The guards of the present invention are further designed to absorb a portion of the energy generated when a low-elevation vehicle collides with the rear end of a high elevation vehicle.

In accordance with the present invention, a torsional under-ride guard adapted to be mounted to a high elevation vehicle is provided, having: at least one torsional elastic joint; a bumper member, moveable between an at-rest position and a retracted position; at least one return stop block; and optionally, a spring biasing element, preferably a compression spring; wherein the at least one return stop block is adapted to prevent the bumper member from automatically returning to the at-rest position from the retracted position. In a preferred embodiment, the return stop block comprises: a guide having a bore passing therethrough, and a moveable bar having a first end and a second end with a head at the first end, wherein the moveable bar slideably extends through the bore and wherein the head is configured so that it cannot bass through the bore. Preferably, the moveable bar comprises a bolt. Optionally, the moveable bar may further have a follower at the second end.

In accordance with the present invention, a torsional under-ride guard is provided which further has a pair of levers connecting the bumper member and the torsional elastic joint, wherein the levers are spaced apart from one another and wherein the bumper member extends between the levers or, alternatively, beyond the levers.

In accordance with the present invention, a torsional under-ride guard is provided which has a torsional elastic joint comprising an outer tubular member, an inner member disposed generally concentrically within and spaced from the outer member for rotation relative thereto about a common axis, and at least one yieldable restraint disposed within the outer member and interacting between it and the inner member to effect a resistance against the relative rotation of the outer and inner members about the common axis.

In a preferred embodiment, the present invention provides a torsional under-ride guard, wherein the torsional elastic joint has an outer tubular member having a plurality of annularly symmetrically arranged internal surfaces defining an opening therethrough, an inner member generally concentrically disposed within the opening through the outer member and spaced from the outer member for rotation relative thereto about a common axis, the inner member having a plurality of annularly symmetrically-arranged external surfaces each of which is normally oriented to face radially outwardly toward a pocket formed by the juncture between two of the internal surfaces on the outer member, and a plurality of elastic, cushioning elements normally disposed under radial compression between the external surfaces on the inner member and the internal surfaces of the outer member.

In another preferred embodiment, the invention provides a torsional under-ride guard wherein the torsional elastic joint has an outer tubular member, an inner member disposed generally concentrically within and spaced from the outer member for rotation relative thereto about a common axis, and a plurality of elastic cushioning members disposed between the interior of the outer member and the exterior of the inner member for yieldingly holding the inner and outer members generally concentric to one another and yieldingly restraining relative rotation thereof.

In yet another preferred embodiment, the invention provides a torsional under-ride guard wherein the torsional elastic joint has an outer tubular member, an inner member disposed generally concentrically within the outer member and spaced therefrom for rotation relative thereto about a common axis, and a plurality of elastic rollers disposed between the interior of the outer member and the exterior of the inner member in substantially uniformly spaced relationship about the inner member, the outer member having a regular polygonal inner profile in a transverse plane providing substantially flat, roller-engaging surfaces having axially-extending junctions, the sides of the inner member, in transverse section, substantially defining a symmetrical, closed, polygonal figure and the number of roller-engaging sides of which correspond to the number on the outer member and having protuberances at the junctions of adjacent sides, the protuberances providing roller-engaging extensions of the sides of the inner member beyond the sides of a regular polygonal figure in the same peripheral direction with respect to the common axis.

In still another preferred embodiment, the invention provides a torsional under-ride guard wherein the torsional elastic joint has an outer tubular member having a first end and a second end, a first inner member, a second inner member, and at least one yieldable restraint, wherein the first inner member and the second inner member are disposed generally concentrically within and spaced from the outer member for rotation relative thereto about a common axis at the first end and second end, respectively, and wherein the yieldable restraint is disposed within the outer member and interacts between the outer member and the first and second inner members to effect a resistance against the relative rotation of the outer and inner members about the common axis.

In another aspect of the present invention, a torsional under-ride guard is provided, which has a torsional elastic joint and a bearing arrangement; wherein the torsional elastic joint includes an outer tubular member, at least one inner member, and at least one yieldable restraint disposed within the outer member and interacting between it and the inner member to effect a resistance against the relative rotation of the outer and inner members about a common axis; and wherein the bearing arrangement positively maintains the inner and outer members concentric with respect to the common axis.

In a preferred embodiment, the bearing arrangement comprises a housing member rigidly secured to the inner member for rotation therewith relative to the outer member and a bearing element adapted to maintain the inner and outer members concentric with respect to the common axis, wherein the housing member together with the outer member defines a bearing race about the outer member, and wherein the bearing element is disposed within the bearing race.

In another preferred embodiment, the bearing arrangement has a bearing recess defined by portions of the inner and outer members, the bearing recess being open at one end, a bearing element disposed within the bearing recess to maintain concentricity of the inner and outer members, and a releasable element retaining the bearing element in the recess against endwise removal.

In yet another preferred embodiment, the bearing arrangement comprises a housing member secured to the inner member and overlying a portion of the exterior of the outer member to define a bearing recess surrounding the outer member, a longitudinally split bearing element disposed within the bearing recess and provided with a cylindrical outer peripheral surface and a central opening therethrough having a non-circular configuration generally corresponding to and closely embracing the outer member, whereby the bearing element slidably engages the housing member and nonrotatably engages the outer member, and releasable element retaining the bearing element in the bearing recess against endwise removal.

In another aspect of the present invention, a bumper member is provided which optionally has a stepping surface, wherein the stepping surface has anti-slip characteristics.

In another aspect of the present invention at least one stop block is provided which is adapted to provide a positive mechanical stop for the bumper member when the bumper member is in a retracted position.

In another aspect of the present invention a torsional under-ride guard is provided, having: a torsional elastic joint which is adapted to be mounted to a high elevation vehicle and which has an outer tubular member, an inner member disposed generally concentrically within the outer member and spaced from the outer member for rotation relative to the outer member about a common axis, and a plurality of elastic rollers disposed between the interior of the outer member and the exterior of the inner member in substantially uniformly spaced relationship about the inner member, the outer member having a regular polygonal inner profile in a transverse plane providing substantially flat, roller-engaging surfaces having axially-extending junctions, the sides of the inner member, in transverse section, substantially defining a symmetrical, closed, polygonal figure and the number of roller-engaging sides of which correspond to the number on the outer member and having protuberances at the junctions of adjacent sides, the protuberances providing roller-engaging extensions of the sides of the inner member beyond the sides of a regular polygonal figure in the same peripheral direction with respect to the common axis; a bearing arrangement for maintaining the inner and outer members concentric with the common axis; a pair of levers spaced apart from one another and adapted to be attached to the inner member extending therefrom downwardly and towards a rear of the high elevation vehicle when in an at-rest position and movable between the at-rest position and a retracted position; a bumper member connected to and extending between the levers; at least one stop block adapted to provide a positive mechanical stop for the levers when in the retracted position; and at least one return block adapted to prevent the levers from automatically returning to the at-rest position from the retracted position.

In another aspect of the present invention, a torsional under-ride guard is provided, having: a torsional elastic joint, adapted to be mounted to a high elevation vehicle, having an outer tubular member having a first end and a second end, a first inner member, a second inner member, and at least one yieldable restraint, wherein the first inner member and the second inner member are disposed generally concentrically within and spaced from the outer member for rotation relative to the outer member about a common axis at the first end and second end, respectively, and wherein the yieldable restraint is disposed within the outer member and interacts between the outer member and the first and second inner members to effect a resistance against the relative rotation of the outer and inner members about the common axis; a bearing arrangement for positively maintaining the inner and outer members concentric with respect to the common axis; a pair of levers spaced apart from one another and adapted to be attached to the inner members extending therefrom downwardly and towards a rear of the high elevation vehicle when in an at-rest position and movable between the at-rest position and a retracted position; a bumper/step member connected to and extending between the levers; at least one stop block adapted to provide a positive mechanical stop for the levers when in the retracted position; and at least one return block adapted to prevent the levers from automatically returning to the at-rest position from the retracted position.

DETAILED DESCRIPTION OF THE INVENTION

Figure 1:
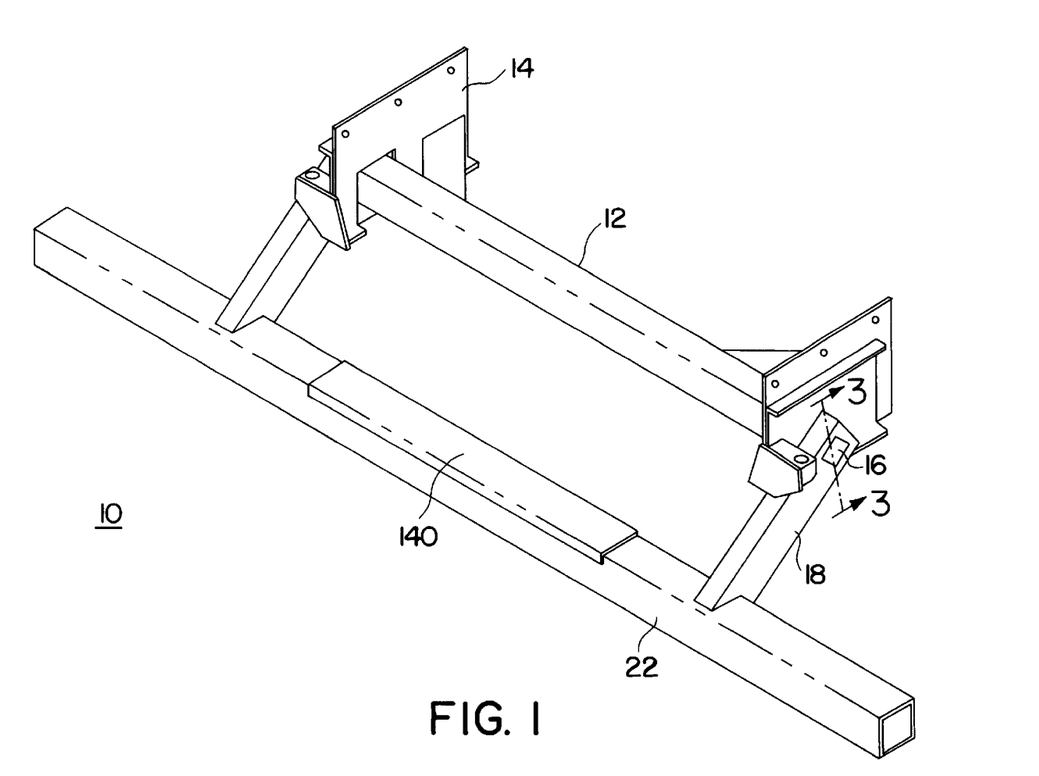
FIG. 1 is a perspective view of a preferred torsional under-ride guard of the invention.

FIG. 1 illustrates a torsional under-ride guard 10 of the present invention. The torsional under-ride guard 10 is adapted to be mounted transversely to the frame or body of a high elevation vehicle (not shown) by brackets 14. The torsional under-ride guard 10 includes a torsional elastic joint 11 comprising a tubular outer member 12 and an inner member 16 mounted concentrically within the outer member; levers 18 connecting the inner member 16 and a cross bar 22. Alternatively, the levers 18 and cross bar 22 may comprise a single unitary element (this embodiment not shown). The cross bar 22 is spaced from the inner member 16 along the levers 18 to provide a moment arm through which the force of an impact against the cross bar 22 acts to apply a torque to the inner member 16.

The torsional under-ride guard 10 may be mounted to the frame or body of a high elevation vehicle by, for example, welding, bolting or riveting.

The cross bar 22 is shown in FIG. 1 as a length of square tube. Notwithstanding, those skilled in the art will recognize that a multitude of different constructions could be substituted for the square tube shown. That is, the cross bar 22 could comprise a tube with any geometric cross section. For example, the cross bar 22 could comprise a tube having a rectangular cross section, a circular cross section, etc. Alternatively, the cross bar 22 can comprise a solid bar of any geometric cross section, for example a solid bar of circular cross section, a solid bar of rectangular cross section, a solid bar of square cross section, etc.

The cross bar 22 may exhibit the dual function of a bumper and a step. The cross bar 22 may include a skid resistant stepping surface 140. The skid resistant stepping surface may comprise grit sputter-deposited on the surface of the cross bar 22 by known means. Alternatively, the skid resistant stepping surface may comprise diamond plate, expanded metal, self adhesive grit tread, or the like.

The cross bar 22 may be attached to the levers 18 using any known attachment means, which means impart a bond sufficient to satisfy the strength requirements of the under-ride guard of the instant invention. Preferably, the cross bar 22 is attached to the levers 18 using conventional welding techniques.

Figure 2:
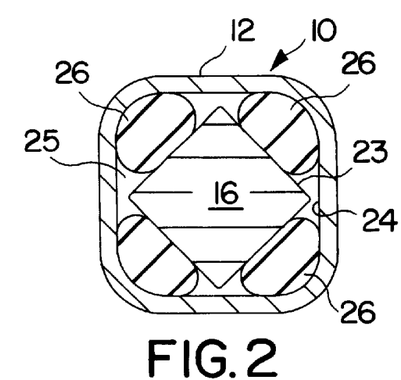
FIG. 2 is a transverse cross section taken along line 4—4 of FIG. 8 and showing the cushion elements at rest.

In a preferred aspect of the present invention, the torsional elastic joint 11 comprises an outer member 12; an inner member mounted concentrically within the outer member; and a number of resilient elastic rubber-like cushioning elements 26, as illustrated in FIG. 2 in an at rest position when there is no impact force being exerted on the cross bar 22. Particularly, as shown in FIG. 2, the tubular outer member 12 surrounds the inner member 16 with the external side surface 23 of the inner member 16 opposite the apices defined by the junctions between the internal side surfaces 24 of the outer member 12 to form four generally triangular pockets 25 in which a corresponding number of resilient elastic rubber-like cushioning elements 26 are disposed with their longitudinal axes parallel to the common axis of the inner member 16 and the outer member 12. Both the inner member 16 and the tubular outer member 12 are substantially square in cross section with a longitudinal juncture of their side surfaces being more or less rounded to eliminate sharp external edges or comers which could damage the cushioning elements 26.

In one preferred embodiment, the outer member 12 is rigidly secured to the frame or body of the high elevation vehicle by means of the brackets 14 and the inner member 16 is connected to cross bar 22 by means of levers 18. In this embodiment, the force of an impact against cross bar 22 is transmitted to the high elevation vehicle through the levers 18. The resulting torque causes the inner member 16 to rotate with respect to the outer member 12 through an angle ø varying with the force of the impact against cross bar 22. With the outer member 12 rigidly held against rotation, deflection of the lever 18 in a counter clockwise direction through an angle ø will cause the inner member 16 to rotate through the same angle to the loaded condition illustrated in FIG. 3.

It should be noted that if the force of the impact against cross bar 22 is below a defined minimum force, the torsional under-ride guard 10 will resiliently absorb the force of the impact and return the cross bar 22 to its at-rest position upon dissipation of the impact force. In the event the force of impact against cross bar 22 exceeds the defined minimum force, one or more return stop blocks 100, illustrated in FIG. 4, will engage the levers 18 and prevent the cross bar 22 from returning to its at-rest position upon removal of the impact force. Accordingly, in the event of a high impact collision (i.e., a collision which generates an impact force in excess of the defined minimum force) between another vehicle and the cross bar 22 mounted on a high elevation vehicle, the return stop blocks 100 will alleviate the potential that the torsional under-ride guard 10 may cause the movement of the vehicles following the dissipation of the impact force. That is, the return stop blocks 100 will prevent the torsional under-ride guard 10 from exerting a force, which might cause the vehicles to separate or move relative to one another. Such separation or relative movement of the vehicles post-collision could present a danger to the occupants of the vehicles, bystanders and rescue personnel.

Figure 4:
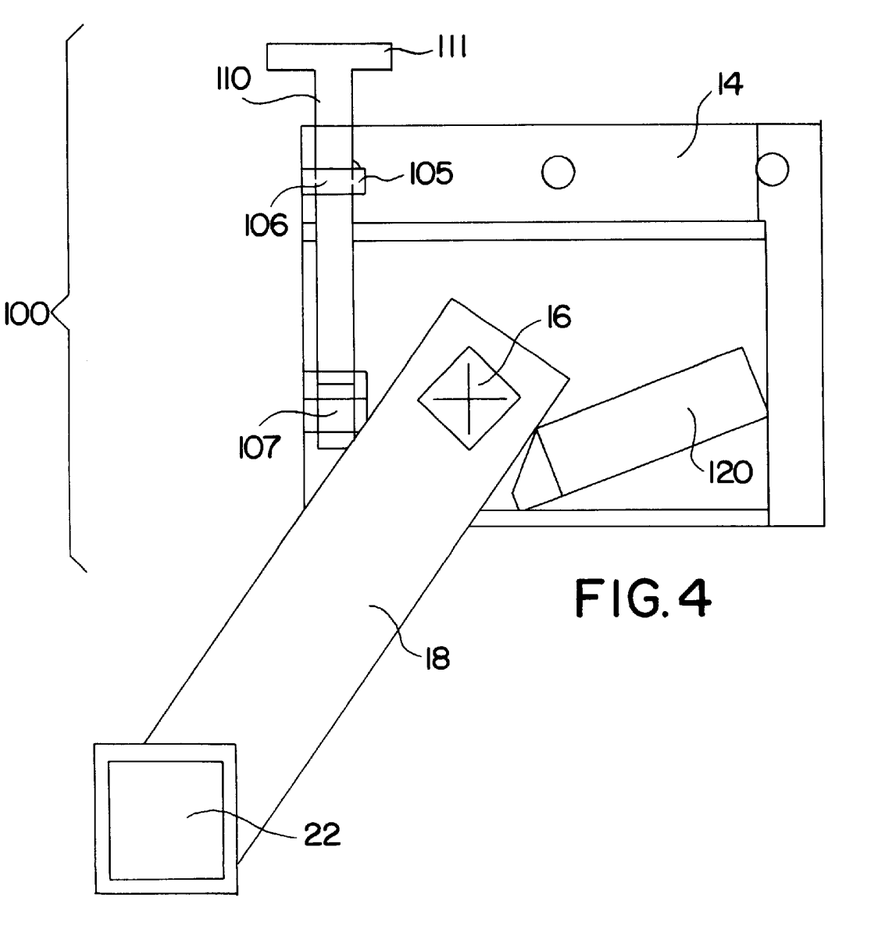
FIG. 4 is a partial side view of a torsional under-ride guard of the present invention in an at-rest condition.

In one preferred aspect of the present invention, the return stop block 100 comprises a guide 105 and a moveable bar 110. The guide 105 is preferably affixed to the bracket 14 and has a bore 106 passing therethrough. The moveable bar 110 has two ends, with a head 111 at a first end, which head 111 is configured so that it cannot pass through the bore 106. The second end of moveable bar 110 passes through the bore 106 and extends beyond guide 105 and can freely slide up and down relative to guide 105. Preferably, the moveable bar 110 has a follower 107 connected thereto at the second end. The follower 107 may serve at least two purposes. First, the follower 107 can add mass to the second end of the moveable bar 110 to help facilitate operation of the return stop block 100. Second, the follower 107 can be configured so that it cannot pass through bore 106, thus alleviating the potential that moveable bar 110 may be shaken out of guide 105 during use of the torsional under-ride guard.

Figures 5, 6:
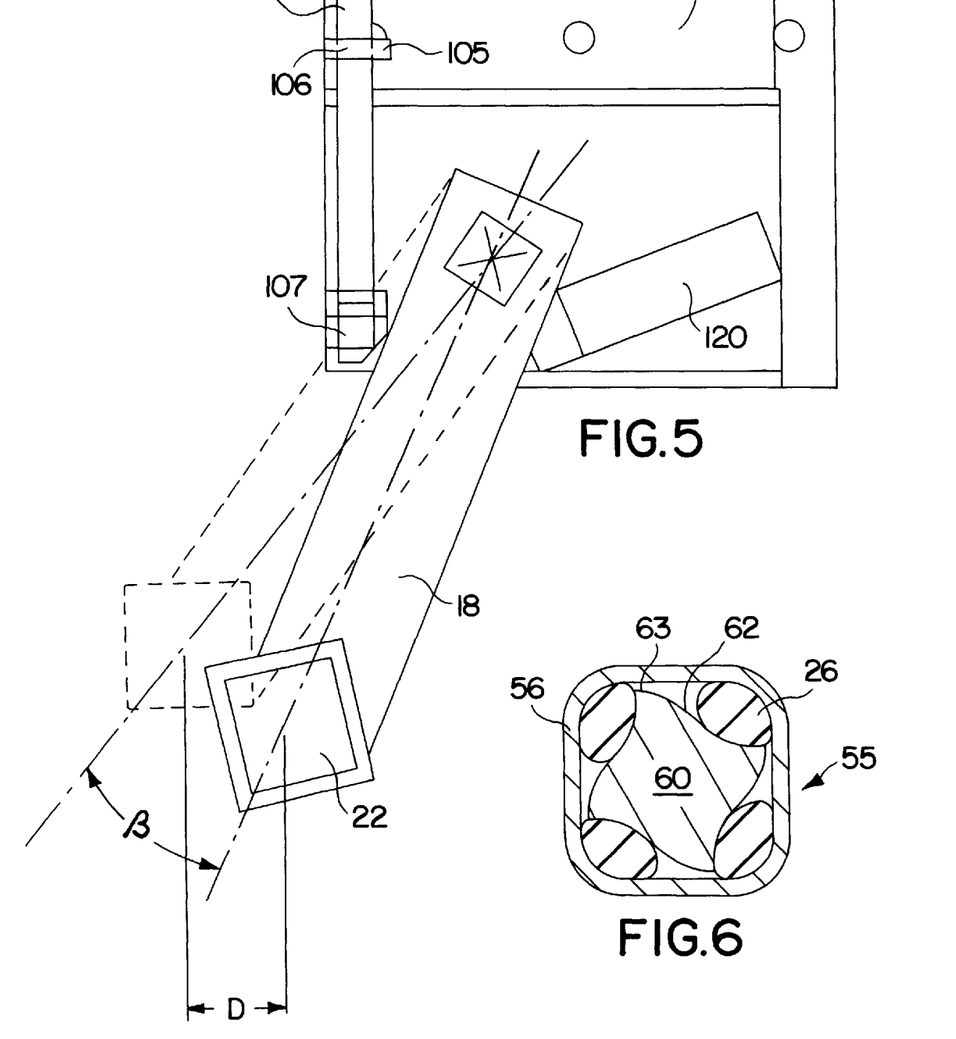
FIG. 5 is a partial side view of a torsional under-ride guard of the present invention in a fully retracted condition.
FIG. 6 is a transverse cross section similar to that of FIG. 2 showing a modified cross-sectional configuration for the inner member.

In operation, as the cross bar 22 transitions from its at rest position to its fully retracted position it will move a linear distance D, and lever 18 will swing through an angle β, and moveable bar 110 will fall relative to guide 105, see FIGS. 4 and 5. When the cross bar 22 is in its fully retracted position, moveable bar I 10 will move into position to prevent lever 18 from rebounding, locking the cross bar 22 in its fully retracted position, see FIG. 5.

The National Highway Traffic Safety Adrministration ("NHTSA") has promulgated standards for rear impact guards. (49 CFR Part 571). To satisfy the rear impact guard standards promulgated by the NHTSA, a guard must resist a specified force within the first five inches of displacement. In view of the NHTSA standard, the linear distance D for the torsional under-ride guard of the present invention is preferably five (5) inches or less, most preferably five (5) inches. Notwithstanding, one skilled in the relevant art will recognize that the torsional under-ride guard of the present invention may be configured to have a linear distance D in excess of five inches. Particularly, the maximum limit for the linear distance D is dictated by the maximum angle ø, discussed hereinbelow, and the length of levers 18. Also, one skilled in the art will recognize that angle β is directly related to, and limited by, the linear distance D and the length of levers 18. Preferably, angle β will be about twenty-one (21°) or less.

In one aspect of the invention, moveable bar 110 freely slides up and down relative to guide 105 within bore 106. That is, moveable bar 110 is biased to move in a downward direction by the force of gravity.

Figure 9:
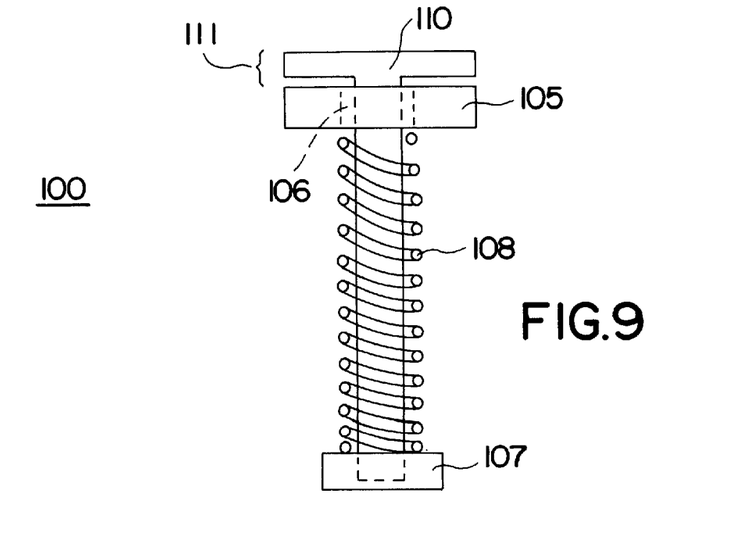

In another aspect of the invention, moveable bar 110 is biased to move in a downward direction by the combination of the force of gravity and the force exerted by a spring 108. The spring 108 preferably comprises a compression spring, see FIG. 9.

Preferably, moveable bar 110 comprises a bolt.

Follower 107 can be connected to moveable bar 110 by any conventional means or combination of conventional means, including, but not necessarily limited to, welding, threading, brazing, and the like.

Figure 3:
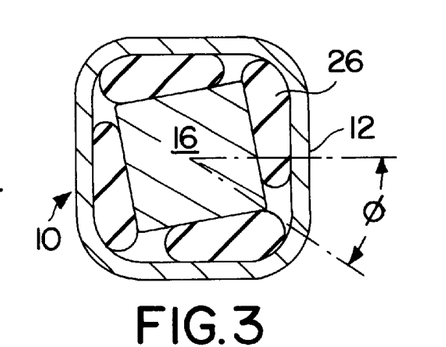
FIG. 3 is a transverse cross section showing the cushioning elements of FIG. 2 under the force of an impact.

Also, the relative rotation of the inner member 16 with respect to the outer member 12 is resisted by the cushioning elements 26, each of which tends to rotate counter-clockwise as shown in FIGS. 2 and 3, along the original engaging side of the inner member 16 and one of the original engaging sides of the outer member 12. In this manner, the cushioning elements 26 are subjected substantially only to compression between two surfaces, which surfaces approach a substantially parallel, dead-center relationship with angle ø equal to 45° (where the inner member 16 and the outer member 12 are square in transverse section). So long as the maximum compression at the dead-center position is not reached, the parts will move back to their original positions upon removal of the applied torque.

In the event of a high impact collision, the levers 18 will contact impact stop blocks 120, which impact stop blocks 120 perform at least two functions. First, the impact stop blocks 120 operate to facilitate the transfer of an impact force to the frame of the high elevation vehicle. Second, the cushioning elements 26 can only resiliently absorb a given amount of impact energy. That is, if a given absorption maximum impact energy is applied to the elastic torsional joint 11, inner member 16 could over-rotate within tubular outer member 12. As a result of such over-rotation, levers 18 and the cross bar 22 would not return to their pre-impact at-rest positions. The impact stop blocks 120 operate to prevent the cushioning elements 26 from being subjected to impact energy in excess of their absorption maximum.

FIG. 6 shows a modified elastic joint 55 employing a modified inner member 60 having an alternative cross-sectional configuration. In this embodiment, the symmetrically arranged side surfaces 62 of the modified inner member 60 have been curved and provided with slight projections 63 to extend the effective length of the side surfaces 62, thus increasing the angle through which the modified inner member 60 and the outer member 56 can safely rotate without increasing the overall dimensions of the outer member 56. This embodiment also provides for an increase in the maximum absorption energy for the elastic joint relative to an elastic joint wherein everything is the same except that the symmetrically arranged side surfaces of modified inner member 60 have not been curved and provided with slight projections 63.

Of the elastic joint forms illustrated, the form shown in FIG. 6 requires that the concentricity be maintained more closely between the modified inner member 60 and the outer member 56, respectively, to insure trouble-free operation of the joint.

Figure 7:
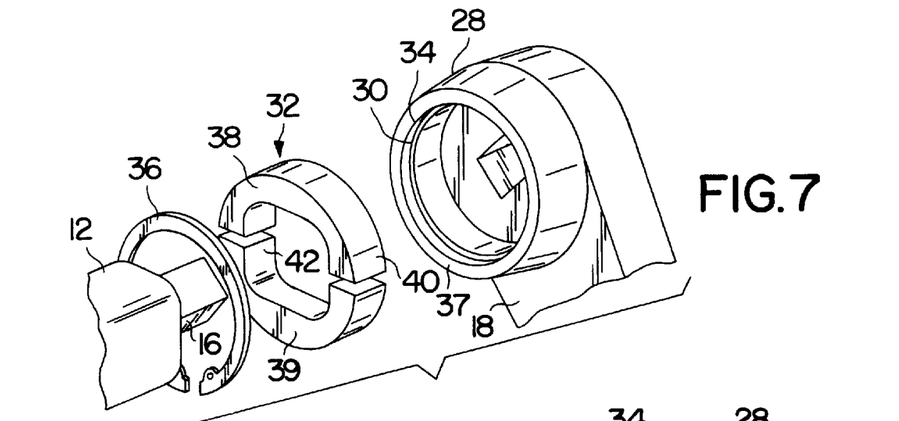
FIG. 7 is an exploded view showing the bearing arrangement of the present invention.
Figure 8:
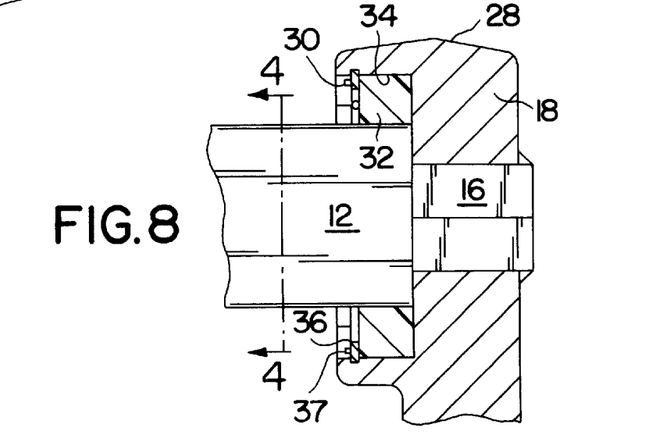
FIG. 8 is a longitudinal cross section of the bearing arrangement taken along line 3—3 in FIG. 1; and, FIG. 9 is a schematic view of a stop block of the present invention having an optional compression spring.

FIGS. 7 and 8 illustrate a compact bearing arrangement for maintaining the concentricity between the common axis of the inner member 16 and the outer member 12. The bearing arrangement includes a housing 28 formed as an integral portion of the lever 18 and defining a bearing recess 30 extending transversely of the lever 18 for receiving a split bearing element 32. The internal wall of the housing 28 is slidingly engaged by an external surface of the bearing element 32. The bearing element 32 is axially positioned within the recess 30 by a retainer ring 36 disposed in a groove 37 located outwardly of the bearing race 34.

To facilitate its installation and replacement, the bearing element 32 is preferably divided at one or more places so that it may be slipped over the outer member 12 without disassembling the joint. In the illustrated embodiment, the bearing element 32 is divided into two segments 38 and 39, the outer peripheries of which define a circular cylindrical surface 40 for slidingly engaging the cylindrical inner wall surface of the housing 28 with a minimum of friction as the lever 18 rotates relative to the outer member 12. The inner peripheries of the segments 38 and 39 define a polygonally-shaped central opening 42, the configuration of which corresponds to that of the exterior of the outer member 12. Thus, bearing element 32 is non-rotatably secured to the exterior of the outer member 12, and the only sliding engagement in the bearing arrangement occurs between the outer periphery of the bearing element 32 and the outer wall of the bearing race 34. The segments 38 and 39 of the bearing element 32 are preferably made of a nylon or other suitable bearing material requiring a minimum of lubrication to operate effectively.

With the above-described bearing arrangement, it is not necessary to machine the exterior of the outer member 12 or otherwise prepare it to receive the bearing element 32. Thus, the manufacture of the elastic joint is rendered simpler and more economical, for it is necessary only to cut the inner member 16 and the tubular outer member 12 to their proper lengths prior to securing the lever 18 and bearing assembly to the end of the inner member 16.

If it should be necessary at any time to replace one or both of the bearing segments 38 and 39, one need only release the retainer ring 36 from the groove 37, remove one or both of the old segments 38 and 39 by sliding it axially out of the race 34, and replace the removed segment or segments in the reverse manner. All of this can be accomplished quickly from the exterior of the elastic joint without removing the lever 18 or otherwise disassembling the elastic joint.

Although a particular, preferred from of the flexible coupling and bearing arrangement has been shown and described herein, the invention is not limited thereto, as should be apparent to one skilled in the art. Thus, putting aside questions of cost of the component parts, the inner member 16 and the outer member 12 can preferably, in some instances, have configurations other than those illustrated, with the resulting obvious differences in the number of cushioning elements, in the configuration of the symmetrically-arranged internal and external side surfaces on the outer and inner members, and in the configuration of the bearing element. Examples of three-sided and six-sided designs are disclosed in the patent issued to Hermann J. Neidhart, U.S. Pat. No. 2,712,742, on Jul. 12, 1955. Other variations of the same basic type of flexible coupling are disclosed in the patent issued to Hermann J. Neidhart, U.S. Pat. No. 2,729,442, on Jan. 3, 1956.

In addition to the type of flexible coupling in the aforementioned patents, other basically different coupling designs may be used in accordance with the present invention, although the particular designs mentioned above are preferred, both from the standpoint of cost and operating characteristics, for practically all applications of the present invention which are likely to be encountered in the broad field of torque transmission. Nevertheless, a variety of other forms of flexible couplings are capable of being used in accordance with the general principles of the present invention.

The concepts of the invention will now be illustrated by the following Examples, which are intended to be purely exemplary and not limiting.

EXAMPLE 1

A guard strength test was performed on an under-ride guard of the present invention. That is, an under-ride guard of the present invention was tested to determine whether it could absorb a given force exerted at a point along the cross bar without undergoing a horizontal displacement in excess of five (5) inches. Specifically, the under-ride guard was affixed to a rigid test fixture and subjected to a force at three different locations along the length of the cross bar. Particularly, the under-ride guard was subjected to a force exerted on the cross bar by a force plate at a point, P1, on the cross bar displaced from the middle of the cross bar by a distance of ⅜ of the length of the cross bar. The maximum force exerted on the cross bar and the displacement of the cross bar were recorded. The test was repeated with a force being exerted at a point P2 at the middle of the cross bar. The test was repeated again with a force being exerted at a point P3 on the cross bar displaced from the middle of the cross bar by between 355 to 635 mm. The results of these tests are provided below in tabular form.

| Test Point | Max. Load Applied (psi) | Displacement at Max. Load (in.) |
| --- | --- | --- |
| P1 | 11,423 | 4.1 |
| P2 | 11,458 | 3.4 |
| P3 | >28,126* | 5.0 |

EXAMPLE 2

An energy absorption test was performed on the under-ride guard of Example 1. That is, the under-ride guard is subjected to a force at P3, which force was sufficient to displace the cross bar a linear distance of 5 inches. The force was then removed. The force exerted on the cross bar was recorded at least ten times for each inch of displacement, both on extension of the force plate and on retraction thereof A force vs. deflection diagram was plotted using the recorded force measurements. From this diagram, the energy absorption for the under-ride guard was calculated (that is, only plastic deformation was included, the elastic rebound of the guard was not counted towards the energy absorption value). Specifically, the energy absorption measured for the subject under-ride guard was 6,419 joules*.

*Due to limitations in the test apparatus, the actual force exerted on the under-ride guard by the test apparatus was greater than the force actually reported by the apparatus.

We claim:
1. A torsional under-ride guard, comprising:
   (a) at least one torsional elastic joint, adapted to be mounted to a high elevation vehicle;
   (b) a bumper member connected to the torsional joint and moveable between an at-rest position and a retracted position; and
   (c) at least one return stop block adapted to prevent the bumper member from automatically returning to the at-rest position from the retracted position;
      wherein the return stop block comprises a guide having a bore passing therethrough, and a moveable bar which slideably extends through the bore.

2. The torsional under-ride guard of claim 1, wherein the moveable bar has a first end and a second end with a head at the first end, which head is configured so that the head cannot pass through the bore.

3. The torsional under-ride guard of claim 2, wherein the moveable bar is a bolt.

4. The torsional under-ride guard of claim 2, wherein the moveable bar further comprises a follower at the second end.

5. The torsional under-ride guard of claim 2, wherein the return block further comprises a spring biasing element.

6. The torsional under-ride guard of claim 5, wherein the spring biasing element comprises a compression spring.

7. The torsional under-ride guard of claim 1, wherein the bumper member further comprises a pair of levers connecting the bumper member and the torsional elastic joint.

8. The torsional under-ride guard of claim 7, wherein the levers are spaced apart from one another and wherein the bumper member extends between the levers.

9. The torsional under-ride guard of claim 8, wherein the bumper member extends beyond the levers.

10. The torsional under-ride guard of claim 7, wherein the movement of the bumper member from the at-rest position to the retracted position defines an angle β and a displacement D.

11. The torsional under-ride guard of claim 10, wherein the displacement D is 5 inches.

12. The torsional under-ride guard of claim 10, wherein the angle β is 21°.

13. The torsional under-ride guard of claim 1, wherein the torsional elastic joint comprises:
    (a) an outer tubular member;
    (b) an inner member disposed generally concentrically within and spaced from the outer member for rotation relative thereto about a common axis; and
    (c) at least one yieldable restraint disposed within the outer member and interacting between it and the inner member to effect a resistance against the relative rotation of the outer and inner members about the common axis.

14. The torsional under-ride guard of claim 1, wherein the torsional elastic joint comprises:
    (a) an outer tubular member having a plurality of annularly symmetrically arranged internal surfaces defining an opening therethrough;
    (b) an inner member generally concentrically disposed within the opening through the outer member and spaced from the outer member for rotation relative thereto about a common axis, the inner member having a plurality of annularly symmetrically-arranged external surfaces each of which is normally oriented to face radially outwardly toward a pocket formed by the juncture between two of the internal surfaces on the outer member, and
    (c) a plurality of elastic, cushioning elements normally disposed under radial compression between the external surfaces on the inner member and the internal surfaces of the outer member.

15. The torsional under-ride guard of claim 1, wherein the torsional elastic joint comprises:
    (a) an outer tubular member;
    (b) an inner member disposed generally concentrically within and spaced from the outer member for rotation relative thereto about a common axis; and
    (c) a plurality of elastic cushioning members disposed between the interior of the outer member and the exterior of the inner member for yieldingly holding the inner and outer members generally concentric to one another and yieldingly restraining relative rotation thereof.

16. The torsional under-ride guard of claim 1, wherein the torsional elastic joint comprises:
    (a) an outer tubular member;
    (b) an inner member disposed generally concentrically within the outer member and spaced therefrom for rotation relative thereto about a common axis; and
    (c) a plurality of elastic rollers disposed between the interior of the outer member and the exterior of the inner member in substantially uniformly spaced relationship about the inner member, the outer member having a regular polygonal inner profile in a transverse plane providing substantially flat, roller-engaging surfaces having axially-extending junctions, the sides of the inner member, in transverse section, substantially defining a symmetrical, closed, polygonal figure and the number of roller-engaging sides of which correspond to the number on the outer member and having protuberances at the junctions of adjacent sides, the protuberances providing roller-engaging extensions of the sides of the inner member beyond the sides of a regular polygonal figure in the same peripheral direction with respect to the common axis.

17. The torsional under-ride guard of claim 1, further comprising a bearing arrangement,
    wherein the torsional elastic joint comprises an outer tubular member, at least one inner member, and at least one yieldable restraint disposed within the outer member and interacting between it and the inner member to effect a resistance against the relative rotation of the outer and inner members about a common axis; and
    wherein the bearing arrangement positively maintains the inner and outer members concentric with respect to the common axis.

18. The torsional under-ride guard of claim 17, wherein the bearing arrangement comprises a housing member rigidly secured to the inner member for rotation therewith relative to the outer member and a bearing element adapted to maintain the inner and outer members concentric with respect to the common axis;
    wherein the housing member together with the outer member defines a bearing race about the outer member; and
    wherein the bearing element is disposed within the bearing race.

19. The torsional under-ride guard of claim 17, wherein the bearing arrangement comprises a bearing recess defined by portions of the inner and outer members, the bearing recess being open at one end, a bearing element disposed within the bearing recess to maintain concentricity of the inner and outer members, and a releasable element retaining the bearing element in the recess against endwise removal.

20. The torsional under-ride guard of claim 17, wherein the bearing arrangement comprises a housing member secured to the inner member and overlying a portion of the exterior of the outer member to define a bearing recess surrounding the outer member, a longitudinally split bearing element disposed within the bearing recess and provided with a cylindrical outer peripheral surface and a central opening therethrough having a non-circular configuration generally corresponding to and closely embracing the outer member, whereby the bearing element slidably engages the housing member and nonrotatably engages the outer member, and a releasable element retaining the bearing element in the bearing recess against endwise removal.

21. The torsional under-ride guard of claim 1, wherein the bumper member has a stepping surface.

22. The torsional under-ride guard of claim 21, wherein the stepping surface comprises an anti-slip material applied.

23. The torsional under-ride guard of claim 1, further comprising at least one stop block adapted to provide a positive mechanical stop for the bumper member when in the retracted position.

* * * * *